United States Patent Office 3,430,750
Patented Mar. 4, 1969

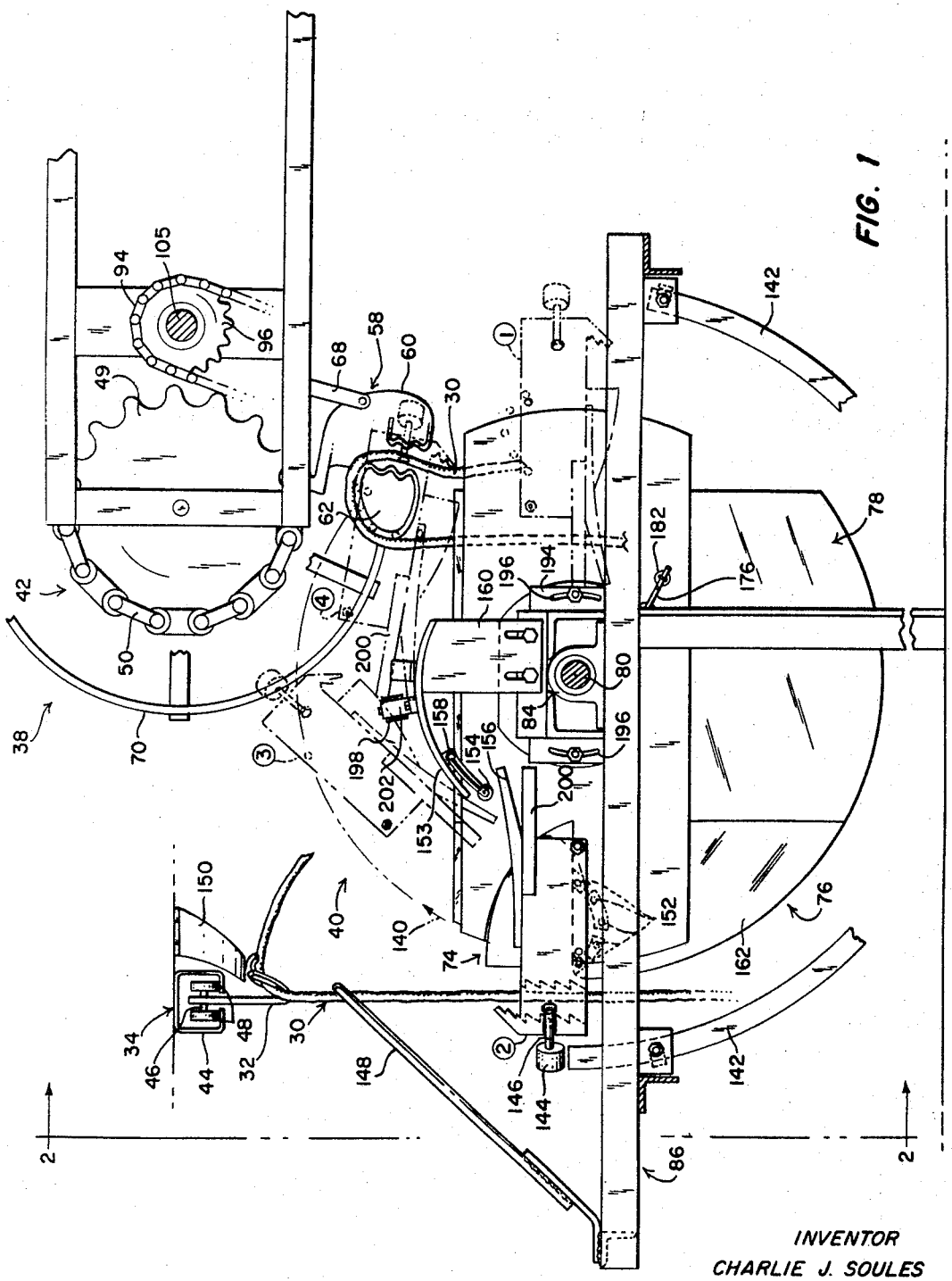

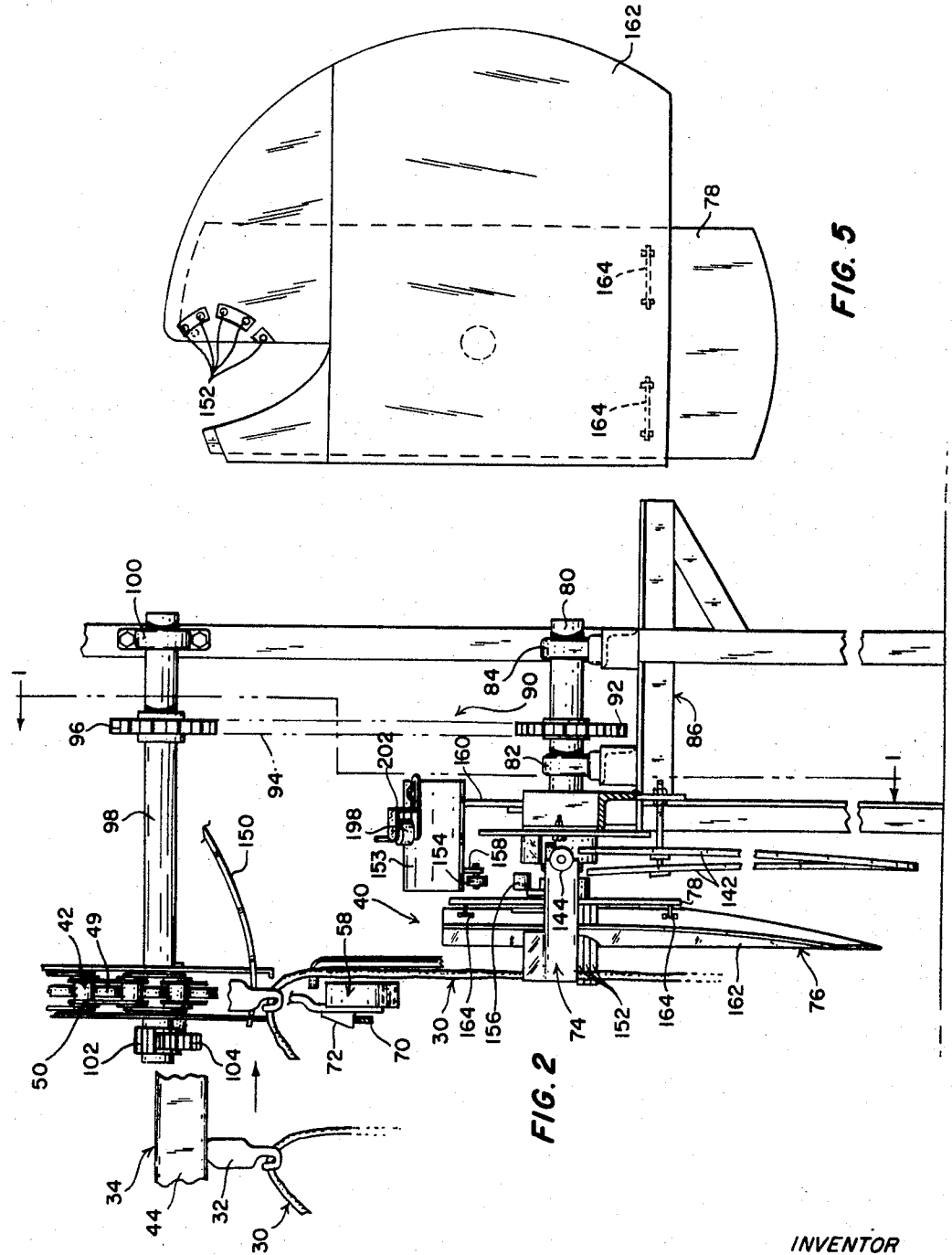

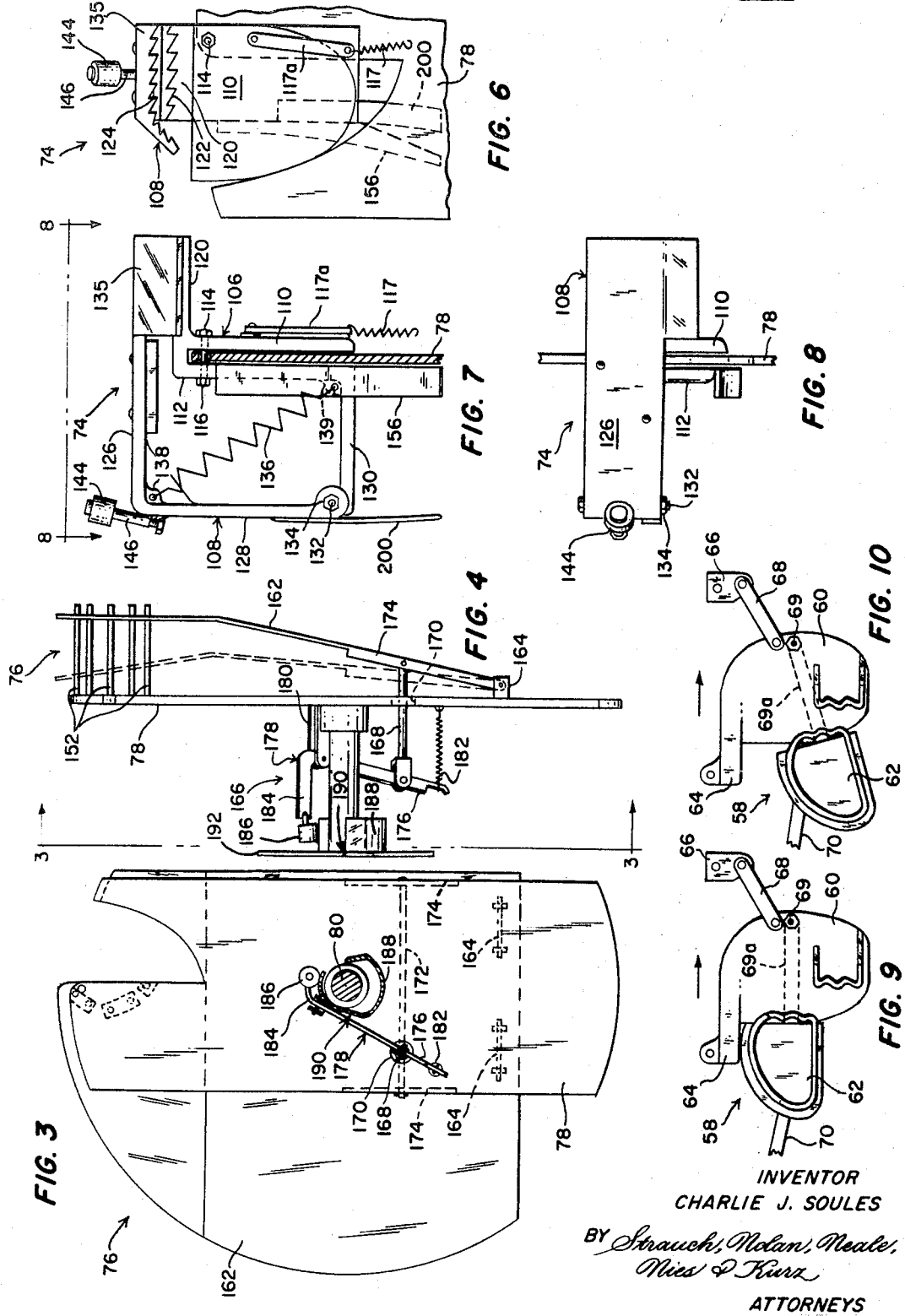

3,430,750
ROTARY GRIPPER TRANSFER MECHANISM
Charlie J. Soules, 1115 Willow St.,
Yakima, Wash. 98902
Filed Mar. 28, 1967, Ser. No. 626,494
U.S. Cl. 198—25                                15 Claims
Int. Cl. B65g 47/61, 29/00

ABSTRACT OF THE DISCLOSURE

Apparatus useful, in one application, for transferring hop vines from an overhead conveyor to the feed conveyor of an upright hop picker including a grasper device for engaging the vines held by the overhead conveyor and operating mechanism for thereafter so manipulating and shifting the grasper device as to disengage the vine from the overhead conveyor and transfer it to the feed conveyor. An unloader then positions the vine in a grasper device incorporated in the feed conveyor. After the latter snaps shut the operating mechanism opens the grasping device of the transfer and positions it to receive another vine.

Background and summary of the invention

This invention relates to hop picking machines and, more specifically, to mechanism for automatically transferring hop vines from overhead conveyors to the feed conveyors of hop picking machines. Hops are raised on trellises which are generally sixteen to eighteen feet in height, and the hop vines attain substantially this height. When ripe, the hops have heretofore been picked by hand. However, because of conditions appurtenant to the growing of hops, the brevity of the picking season, the scarcity of labor, and other factors, hand picking of hops is unduly expensive. In addition, the most careful hand picking results in the accumulation of large quantities of leaves and other foreign material in the hops; and the handling and delay involved in sacking or boxing the hops and transporting them to the drying house often results in discoloration, flattening, and bruising of the hops.

The difficulties and disadvantages attending the hand picking of hops has led to the development of hop picking machines. Such machines are of two general types, vertical and horizontal. It is with the former type that the present invention is concerned.

When machine picking is employed, the hop vines are severed a short distance above the ground, taken down from the trellises, and transported to the hop picking machine. There, the vines are hooked onto an overhead conveyor which carries the vertically hanging hop vines to the feed end of the picking machine. In the prior art machines, the vines are removed manually from the overhead conveyor, and the ends or the vines are inserted between the jaws of graspers carried by the feed conveyor of the picking machine. The conveyor drags the vines into the machine where the hops are stripped from the vines.

The main objection to the prior art hop picking machines is the necessity of employing human operators or feeders to remove the vines from the hooks of the overhead conveyors and insert and clasp them in the graspers carried by the conveyor of the hop picking machine. Not only is the labor cost high, but hand feeding is relatively inefficient with the resulting waste often costing as much as or even more than the necessary labor.

The present invention represents an improvement in hop picking machines and eliminates the need for human operators for disengaging the hop vines from the hooks of the overhead conveyor and engaging them in the graspers of the hop picking machine conveyor. Generally speaking, my invention is a novel, relatively simple, comparatively inexpensive apparatus or mechanism for automatically transferring the hop vines from the overhead conveyor to the feed conveyor of the hop picking machine. The major components of this apparatus are a grasper device, an unloader, and mechanism for operating the foregoing components. The grasper is mounted on a continuously rotating crank, and successive incoming vines carried by the overhead conveyor are positioned by appropriate stops for engagement by the grasper as it moves by with the operating mechanism then shutting the grasper on the vine.

As the grasper continues to move, the vine is unhooked from the overhead conveyor and carried to the feed end of the hop picking machine conveyor, which is of the endless type and includes a number of equidistantly spaced graspers. At this point the operating mechanism partially releases the grip of the transfer mechanism grasper on the vine, and the unloader pushes the vine into the grasper of the feed conveyor, which then snaps shut on the vine and carries it into the machine.

Thereafter, as the crank continues to rotate, the operating mechanism opens the jaws of the transfer mechanism grasper; and the cycle is repeated.

From the foregoing, it will be apparent that the primary object of the present invention is the provision of novel apparatus for automatically transferring hop vines from overhead or other delivery conveyor to the feed conveyor of an upright or vertical hop picking machine, thereby eliminating the need of employing human operators to make the transfer.

Other important and related but more specific objects of the present invention include the provision of transfer mechanisms which:

(1) can be readily added to existing installations.

(2) are rugged and dependable and have a long service life.

(3) are relatively simple and comparatively inexpensive to manufacture.

Further important objects and advantages of the present invention and other novel features will become apparent from the appended claims and as the ensuing detailed description proceeds in conjunction with the accompanying drawing:

Brief description of the drawing

In the drawing:

FIGURE 1 is a partially sectioned side view of transfer apparatus constructed in accord with the principles of the present invention;

FIGURE 2 is a partial end view of the apparatus of FIGURE 1, looking in the direction of arrows 2—2 of FIGURE 1;

FIGURE 3 is a partially sectioned side view of a crank and unloader employed in the apparatus of FIGURE 1 with a grasper normally mounted on the crank omitted to more clearly show the details of the latter and is taken substantially along line 3—3 of FIGURE 4;

FIGURE 4 is an end view of the crank and unloader and the operating mechanism for the latter;

FIGURE 5 is an opposite side view of the crank and unloader, looking substantially along line 5—5 of FIGURE 4;

FIGURE 6 is a view similar to FIGURE 3 with the grasper in place, but showing only part of the crank;

FIGURE 7 is a view of the grasper and crank taken substantially along line 7—7 of FIGURE 6;

FIGURE 8 is a view of the grasper and crank taken substantially along line 8—8 of FIGURE 7;

FIGURE 9 is a side view of a grasper incorporated in the feed conveyor of the hop picking machine with the grasper jaws open to receive a vine; and FIGURE 10 is a view similar to FIGURE 9 with the jaws of the grasper closed on a vine.

*Detailed description of a preferred embodiment*

From the foregoing it will readily be apparent that the principles of the present invention are not applicable solely to the handling of hop vines but that they can be employed in mechanism for handling virtually any type of object having an elongated flexible part which can be gripped and manipulated by a transfer mechanism operating in the manner described above. Therefore, as indicated above, the appended claims are intended to cover all applications of the principles of this invention which are not expressly excluded therefrom.

Referring now to FIGURE 1 of the drawing, hop vines 30 are unloaded from a truck or other conveyance (not shown) and attached to the hooks 32 of an overhead conveyor 34, which transports them to the feed end of an upright or vertical hop picking machine 38. There the vines are automatically transferred by a novel transfer device 40 constructed in accord with the principles of the present invention to the feed conveyor 42 of the hop picking machine.

As shown in FIGURES 1 and 2, conveyor 34 includes a channel-like track 44 in addition to hooks 32. Each of the hooks is attached by an axle 46 to a pair of wheels 48 so that hooks 32 are free to move along track 44 to transfer device 40. Since conveyor 34 is of conventional construction and since its details form no part of and are not essential to an understanding of the present invention, a more detailed description of this conveyor is not deemed necessary.

The feed conveyor 42 to which the hop vines are transferred by the transfer device 40 includes rotatably supported sprockets 49 (only one of which is shown) around which an endless, link-type belt 50 is trained. With hop picking machine 38 in operation, belt 50 is continuously driven by an appropriate motor (not shown).

Fixed to endless belt 50 at equidistantly spaced intervals are a plurality of graspers 58, each including a pair of cooperating jaws 60 and 62. Appropriate pins (not shown) extending through an integral extension 64 of each jaw 60 and through a mounting bracket 66, which is connected to the jaw by a link 68 (see FIGURES 9 and 10), fix each jaw 60 to conveyor belt 50.

The movable jaw 62 of each grasper 58 is pivotally fixed to the associated jaw 60 by a bolt or pivot stud 69, which extends through the free end of an elongated arm 69a attached to the jaw member.

As jaw 62 pivots about stud 69, it moves between the open position shown in FIGURE 9 and the closed position shown in FIGURE 10. This opening and closing movement is effected by a cam track 70 mounted adjacent the path of chain 50 in any convenient fashion. Cam follower 72 (see FIGURE 2) integral with jaw 62 rides on cam track 70 as shown in this figure. Cam 70 keeps jaws 60 and 62 separated until the grasper 58 reaches approximately the position in which it is shown in FIGURE 1. At this point follower 72 rides off the end of cam 70; and jaw 62 moves to the closed position shown in FIGURE 10.

Since hop picking machine 38, including feed conveyor 42, is also of conventional construction and as the details of the hop picking machine itself likewise form no part of and are not necessary to an understanding of the present invention, it will not be described further herein.

Referring now to FIGURES 1 and 2, the novel transfer mechanism 40 provided for automatically transferring hop vines 30 from conveyor 34 to the feed conveyor 42 of the hop picking machine includes a grasper 74 and an unloader 76, both of which are mounted on a rotatably supported crank 78. Crank 78, which is an elongated, platelike member (see FIGURE 5), is fixed to a horizontal axle 80, which is rotatably mounted in bearings 82 and 84 of any suitable construction. The bearings, in turn, are fastened to the structural framework of transfer device 40, which is identified generally by reference character 86.

Shaft 80 is drive-connected to feed conveyor 42 by a positive-type drive train to continuously rotate the crank while conveyor 42 is operating and to coordinate the movement of transfer mechanism grasper 74 to the movement of the graspers 58 carried by the endless belt 50 of the feed conveyor. In the embodiment of the present invention illustrated in FIGURE 2, this drive train, identified generally by reference character 90, includes a sprocket 92 fixed to crank shaft 80 for rotation therewith. Sprocket 92 is connected by an endless belt member 94 to a sprocket 95 fixed to an intermediate shaft 86 by suitable bearings 100 (only one of which is shown).

Fixed to the end of shaft 98 opposite sprocket 96 is a gear 102. This gear meshes with a gear 104 fixed to the end of the drive shaft 105 of hop picking machine feed conveyor 42. Accordingly, drive train 90 precisely coordinates the movement of feed conveyor endless belt 50 and transfer mechanism crank 78 and, accordingly, precisely regulates the movement of transfer mechanism grasper 74 with respect to the graspers 58 of feed conveyor 42.

Referring now to FIGURES 1, 2, and 6–8, it is the function of transfer mechanism grasper 74 to physically convey the hop vines 30 from conveyor 34 to a position in which they can be engaged by the graspers 58 of feed conveyor 42. As best shown in FIGURES 6–8, grasper 74 includes a pair of cooperating grasper jaws 106 and 108. Grasper 106, which is of bifurcated construction and has legs 110 and 112 disposed on opposite sides of crank 78, is pivotally fixed to the crank as by a bolt 114 and nut 116 and is biased toward a predetermined angular position relative to the crank by a spring 117 connected at one end to the crank and, at the other, to a link 117a. The link, in turn, is fixed to jaw 106 of the grasper.

Integral with legs 110 and 112 adjacent pivot member 114 is an extension 120 on which teeth 122 are formed. These teeth are adapted to cooperate with teeth 124 on grasper jaw 108 to clamp a hop vine 30 therebetween when the jaws are in the closed position shown in FIGURES 6 and 7.

Referring now specifically to FIGURE 7, jaw 108 is an L-shaped member comprised of legs 126 and 128, and is pivotally fixed to a normally extending leg 130 of jaw 106 as by a bolt 132, which extends through the free end of leg 128, and a nut 134. At the free end of the second leg 126 of jaw 108 is a jaw member 135 in which the teeth 124 are formed.

Jaw 108 is normally biased toward jaw 106 to the closed position shown in FIGURES 6–8 by a spring 136 connected between a lug 138 on jaw 108 and a lug 139 on jaw 106.

Referring now specifically to FIGURE 1, crank 78 rotates in the direction indicated by arrow 140 in FIGURE 1, moving grasper 74 in succession through the positions indicated by numerals ①, ②, ③, and ④ in each operating cycle. As grasper 74 moves from position ① toward position ②, grasper jaw 108 is opened; i.e., moved away from grasper jaw 106 so that a hop vine 30 may be inserted between the jaws. The opening movement of jaw 108 is effected by a cam arrangement including a cam track 142 of generally semicylindrical configuration fixed to transfer mechanism framework 86 adjacent crank 78, and a cam follower 144 rotatably mounted on an axle 146 fixed to jaw 108. Cam track 142 is so configured that, as follower 144 moves along it, jaw 108 is pivoted counterblockwise about pivot member 132 (as shown in FIGURE 7) against the bias exerted by spring 136 to move the jaws apart.

Referring again to FIGURE 1, as grasper 74 approaches position ②, jaws 106 and 108 move upwardly on opposite sides of the stem of the hop vine 30 which is to be transferred to feed conveyor 42. To properly position vine 30 so that it will be between the grasper jaws as they reach position ②, an appropriate stem-positioning stop 148 is fixed to transfer mechanism framework 86.

As grasper 74 reaches FIGURE 2, cam follower 144 rides off the upper end of crank track 142. This removes the restraint on spring 136, which accordingly biases jaw 108 toward jaw 106, grasping the hop vine 30 between the teeth 122 and 124 on the two jaws.

As grasper 74 moves from position ② toward position ③ the stem of the hop vine 30 engaged between jaws 106 and 108 is lifted upwardly, disengaging it from the hook 32 of overhead conveyor 34, which then rolls on down track 44 and is returned to the point at which the hop vines are loaded on conveyor 34. The unhooking of the hop vine is facilitated by a platelike stop 150, positioned adjacent conveyor 34, which prevents upward movement of the hooks and, therefore, produces the upward movement of the hop vine stem relative to the hook necessary to disengage it.

As grasper 74 continues upwardly toward position ④, it is carried closer to hop picking machine feed conveyor 42. In addition, as the grasper moves through this portion of its travel the stem of the hop vine is formed into a configuration in which it can be engaged by the graspers 58 of the feed conveyor.

Specifically, as shown in FIGURE 1, the stem of the hop vine 30 must be formed into a downwardly opening loop before it is inserted into a grasper 58 of the feed conveyor. This is accomplished by training the stem of the vine around an arcuate array of parallel, spaced apart pins or fingers 152 fixed to and extending normally from crank 78 adjacent grasper 74.

As grasper 74 moves from position ② to position ③, it is rotated approximately 90° about pivot member 114 from the relationship to crank 78 shown in position ②, to which it is biased by spring 117, to the relationship shown in position ③. This is accomplished by the cooperation of a stationary cam 153 and roller 154 and an elongated operator or cam follower 156 fixed to jaw 108 of transfer mechanism grasper 74.

Operator 154 is rotatably mounted on an arm 158 which is mounted on and adjustable relative to the bracket 160 to which cam 153 is attached. Bracket 160, in turn, is adjustably fixed to the structural framework 86 of the transfer mechanism.

As will be apparent from FIGURE 1, as grasper 74 moves from position ② to position ③, roller 154 is engaged by grasper-mounted operator 156, guiding the latter onto cam 153, which rotates the grasper relative to supporting crank 78 against the bias of spring 117. As grasper 74 is rotated, it pulls the stem of vine 30 around pins 152, forming it into the configuration shown in FIGURE 1.

The various adjustments of roller cams 153 and 154 are provided so that the rotation of the grasper device relative to the crank can be regulated as necessary.

As crank 78 continues to rotate, transfer mechanism grasper 74 moves from position ③ to position ④, and a grasper 58 of feed conveyor 42 simultaneously arrives at the position shown in FIGURE 1. As the grasper arrives at position ④, the unloader mechanism 76 referred to previously is operated to push the vine 30 into position on the grasper 58 of the feed conveyor with the jaws 106 and 108 of transfer mechanism grasper 74 being partially opened at this point so that the vine may be pushed out of them into the grasper jaws. Concomitantly with the loading of the vine 30 in grasper device 58, its jaw 60 closes; and conveyor 42 moves the vine 30 into the hop picking machine.

Referring now to FIGURES 1-4, unloader 76 includes an unloader member 162, which may be formed of any suitable sheet metal, pivotally fixed to crank 78 by hinges 164. Unloading member 162 is moved between the positions shown in dotted and full lines in FIGURE 4 by an actuating mechanism 166.

Actuating mechanism 166 includes a link 168, which extends through an opening 170 in crank 78 and is pivotally connected at one end to a rod 172 extending between crank-mounted brackets 174. At its opposite end, connecting link 168 is pivotally fixed to one arm 176 of a bell crank 178, which is pivotally mounted in a crank-supported bracket 180. A spring 182, connected between crank arm 176 and crank 78, biases unloading member 162 to the FIGURE 4 dotted line position.

The free end of crank arm 184 rotatably supports a cam follower 186 which is adapted to follow the cam surface 188 of a cam 190. As best shown in FIGURES 1 and 2, cam 190 is fixed to a plate 192 which is bolted to a framework-supported bracket 194. Elongated slots 196 in bracket 194 are provided for angular adjustment of cam 190 and, accordingly, regulation of the operation of the unloading mechanism so it will be operated at the proper instant.

Cam surface 188 is so configured that, as transfer mechanism grasper 74 moves from position ② through position ③ to position ④, unloader member is moved from the FIGURE 4 dotted line position toward the FIGURE 4 full line position to position vine 30 about two inches from the end of fingers 152 (these fingers will typically be on the order of six inches long). The cam is also configured so that, at the instant that unloading member 162 is opposite the grasper 58 of feed conveyor 42, actuating mechanism 166 will snap the unloading member against the jaws 60 and 62 of grasper 58, pushing vine 30 off the fingers onto and around jaw 62 and between jaws 62 and 60. As discussed above, jaw 62 then snaps shut on the vine.

Unloading member 162 remains against the jaws of grasper 58 as it slides past the grasper. This keeps the vine 30 in proper position in grasper 58 until jaw 60 has snapped shut on the vine.

As mentioned previously, for the unloader to operate in the manner just described, the jaws 106 and 108 of transfer mechanism grasper 74 must be partially opened so that vine 30 can be pushed into the grasper 58 of the feed conveyor. This opening of the grasper jaws is accomplished by a stationary, rotatably mounted operator or roller 198 (see FIGURES 1 and 2) and an operator 200 fixed to the movable jaw 108 of transfer mechanism grasper 74. Roller 198 is fixed as by a bracket 202 to the adjustable bracket 160 from which the previously mentioned cam 153 and stationary operator 154 are supported.

As grasper 74 moves from position ③ toward position ④ stationary roller 198 is engaged by operator 200. This pivots jaw 108 about pivot member 132, moving the teeth 124 on jaw 108 away from the teeth 122 on jaw 106 to partially release the grasp on vine 30.

Following the transfer of vine 30 to the grasper 58 of feed conveyor 42, transfer mechanism grasper 74 moves from position ④ toward position ① to repeat the cycle. As crank 78 rotates the grasper toward this position, operator or follower 156 moves off cam 153, and spring 117 pivots grasper 74 counterclockwise as shown in FIGURE 1 to its normal position relative to crank 78. Similarly, follower 200 moves off roller 198, allowing spring 136 to close grasper jaws 106 and 108. Also, cam follower 186 rides off cam surface 188, allowing spring 182 to return unloader member 162 to the position shown in dotted lines in FIGURE 4. This restores the mechanism of the transfer device 40 to the proper configuration for the start of the succeeding cycle.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. Apparatus for handling hop vines and other objects suspendible by an elongated flexible part comprising, in combination, a first conveyor having means for suspending each said object therefrom by the flexible part of the object, a second conveyor having grasper devices adapted to engage and grip said objects, and mechanism for transferring said objects from said first conveyor to said second conveyor including rotatably mounted means for grasping the flexible part of each said object, disengaging it from said first conveyor, and carrying said object in an arcuate path to a position adjacent a grasper device of said second conveyor; and unloader means operable as said object is transferred to the aforesaid position for shifting the flexible part of the object in a direction generally parallel to the axis of rotation of said rotatably mounted transferring means into a position to be grasped by a grasper device of said second conveyor.

2. The apparatus of claim 1, together with stop means adapted to be engaged by the objects suspended from said first conveyor for positioning said objects in such a manner that the flexible parts of said objects can be grasped by said transfer mechanism grasping device.

3. The apparatus of claim 1, together with means drive-connecting said transfer mechanism to said second conveyor to thereby co-ordinate the movements of the transfer mechanism grasper device and the grasper device of the second conveyor.

4. Apparatus for handling hop vines and other objects suspendible by an elongated flexible part comprising, in combination, a first conveyor having means for suspending each said object therefrom by the flexible part of the object, a second conveyor having grasper devices adapted to engage and grip said objects, and mechanism for transferring said objects from said first conveyor to said second conveyor including means for grasping the flexible part of each said object, disengaging it from said first conveyor, and carrying said object to a position adjacent a grasper device of said second conveyor; and unloader means operable as said object is transferred to the aforesaid position for shifting the flexible part of the object into a position to be grasped by the grasper device, said transfer mechanism including a rotatably mounted crank and said unloader means comprising a elongated member pivotally fixed to said crank.

5. The apparatus of claim 4, wherein said crank has object supporting means protruding therefrom and including means for pivoting said elongated member relative to said crank as said object arrives at the position adjacent the grasper device of the second conveyor to thereby push said object off said supporting means and into said grasper device.

6. The apparatus of claim 5, together with means operable coincident to the vine unloading movement of said elongated member to release the grip of the transfer mechanism grasping means upon the object and thereby accommodate the positioning of the object.

7. The apparatus of claim 5, wherein the means for pivoting said elongated member includes a pivotable member mounted on said crank, a stationary cam, a cam follower fixed to one end of said pivotable member, and a motion transmitting link connecting the other end of said pivotable member to the elongated member of the unloader means.

8. The apparatus of claim 7, together with means biasing said elongated member to an inoperative position adjacent said crank.

9. Apparatus for handling hop vines and other objects suspendible by an elongated flexible part comprising, in combination, a first conveyor having means for suspending each said object therefrom by the flexible part of the object, a second conveyor having grasper devices adapted to engage and grip said objects, and mechanism for transferring said objects from said first conveyor to said second conveyor including means for grasping the flexible part of each said object, disengaging it from said first conveyor, and carrying said object to a position adjacent a grasper device of said second conveyor; and unloader means operable as said object is transferred to the aforesaid position for shifting the flexible part of the object into a position to be grasped by the grasper device, said transfer mechanism including a rotatably mounted crank, said transfer mechanism grasping means being pivotally mounted on said crank, and said grasping means including first and second relatively pivotable jaws and means biasing said jaws together.

10. The apparatus of claim 9, together with an arcuate array of object supporting members protruding from said crank adjacent said transfer mechanism grasping means and adapted to have the flexible part of said object trained therearound to form it into a configuration in which it can be inserted into the grasper device of said second conveyor and means for pivoting said transfer means grasping device relative to said crank as said grasping device moves toward the grasper device of the second conveyor to thereby train the flexible part of said object around said protruding members.

11. The apparatus of claim 10, wherein the means for rotating said transfer mechanism grasping devices comprises a stationary stop member and operator means incorporated in said device and adapted to engage said stationary member as said grasper member is moved thereby by said rotating crank, whereby the relative movement between said operator means and said stationary member effects the aforesaid rotation of said transfer mechanism grasping device.

12. The apparatus of claim 9, together with means connected between said crank and said transfer mechanism grasping device and biasing said grasping device to a predetermined position relative to said crank.

13. The apparatus of claim 9, together with operating means for opening the jaws of said grasping device incident to the shifting of the object to the position in which it is adapted to be grasped by the grasper device of the second conveyor to thereby release the grip of said jaws on said object, said operating means comprising a stationary member and an operator connected to one of the grasping device jaws and adapted to engage said stationary member, whereby, as the rotation of said crank carries said grasper device past said stationary member, the engagement of said jaw-connected operator and said stationary member and the relative movement therebetween effects a pivotal movement of the jaw to which said operator is fixed relative to the other jaw of the grasping device against the restraint of said biasing means.

14. The apparatus of claim 9, together with operating means operable subsequent to the transfer of an object to said second conveyor and prior to the engagement of a subsequent object by said transfer mechanism grasper device for opening the jaws of said transfer device for insertion of said subsequent object therebetween, said operating means including a stationary cam track and a cam follower fixed to one of said jaws, said cam track having a surface so configured that, as said follower moves therealong, the jaw to which said follower is connected is pivoted away from the other jaw of the transfer mechanism grasping device.

15. Apparatus for handling hop vines and other objects suspendible by an elongated flexible part comprising, in combination, a first conveyor having means for suspending each said object therefrom by the flexible part of the object, a second conveyor having grasper devices adapted to engage and grip said objects, and mechanism for transferring said objects from said first conveyor to said second conveyor, said transferring mechanism including a rotatable member and a grasper device mounted on said rotatable member for grasping the flexible part of each said object and disengaging it from said first conveyor and carrying said object to a position adjacent a grasper device of said second conveyor; and unloader means operable as said object is transferred to the aforesaid position for shifting the flexible part of the object into a position to be grasped by the grasper device.

References Cited

UNITED STATES PATENTS 3,204,748    9/1965    Soules _____ 198—179

RICHARD E. AEGERTER, *Primary Examiner.*

U.S. Cl. X.R.

198—210

UNITED STATES PATENT OFFICE
CERTIFICATE OF CORRECTION

Patent No. 3,430,750                                                                             March 4, 1969

Charlie J. Soules

It is certified that error appears in the above identified patent and that said Letters Patent are hereby corrected as shown below:

Column 4, line 16, "95" should read -- 96 --; same line 16, cancel "86" and insert -- 98. The intermediate shaft is supported from framework 86 --; lines 70 and 71, "counterblockwise" should read -- counterclockwise --.

Signed and sealed this 31st day of March 1970.

(SEAL)
Attest:

Edward M. Fletcher, Jr.                                        WILLIAM E. SCHUYLER, JR.
Attesting Officer                                                      Commissioner of Patents